US005731968A

United States Patent [19]

Van Der Broeck et al.

[11] Patent Number: 5,731,968

[45] Date of Patent: Mar. 24, 1998

[54] X-RAY APPARATUS COMPRISING A POWER SUPPLY SECTION FOR POWERING AN X-RAY TUBE

[75] Inventors: Heinz Van Der Broeck, Zulpich; Christoph Loef, Aachen; Hans Negle, Nahe; Bernhard Wagner, Hamburg; Martin Wimmer, Bad-Oldesloe, all of Germany

[73] Assignee: U.S. Philips Corporation, New York, N.Y.

[21] Appl. No.: 568,084

[22] Filed: Dec. 6, 1995

[30] Foreign Application Priority Data

Dec. 7, 1994 [DE] Germany .......................... 44 43 551.7

[51] Int. Cl.$^6$ .................................................. H02M 3/315

[52] U.S. Cl. .............................. 363/71; 363/17; 378/111; 378/112

[58] Field of Search ....................... 363/17, 71; 378/105, 378/111, 112

[56] References Cited

U.S. PATENT DOCUMENTS

| | | | |
|---|---|---|---|
| 4,504,895 | 3/1985 | Steigerwald | 378/112 |
| 4,514,795 | 4/1985 | Van der Zwart | 363/71 |
| 4,574,340 | 3/1986 | Baker | 363/41 |
| 4,742,535 | 5/1988 | Hino et al. | 378/111 |
| 4,797,908 | 1/1989 | Tanaka et al. | 378/112 |
| 4,823,250 | 4/1989 | Kolecki | 363/71 |
| 5,123,038 | 6/1992 | Negle et al. | 378/114 |
| 5,155,754 | 10/1992 | Ebersberger et al. | 378/105 |
| 5,272,612 | 12/1993 | Harada et al. | 363/8 |
| 5,602,897 | 2/1997 | Kociecki et al. | 378/105 |

FOREIGN PATENT DOCUMENTS

| | | |
|---|---|---|
| 0315336 | 5/1989 | European Pat. Off. . |
| 3218535 | 11/1983 | Germany . |

*Primary Examiner*—Peter S. Wong
*Assistant Examiner*—Derek J. Jardieu
*Attorney, Agent, or Firm*—Jack D. Slobod

[57] ABSTRACT

An X-ray apparatus, includes a power supply section for powering an X-ray tube (4) with a high-voltage transformer (3) which has two groups of primary and secondary windings provided on the same transformer core, the coupling between the primary windings (16, 26) belonging to different groups being weaker than the coupling between primary and secondary windings (for example, 16, 31) belonging to the same group, the primary windings of the two groups being connected to two inverters (1, 2) which operate at the same frequency. Control of the power at the secondary side is improved in that the inverters are operated at a fixed frequency and with a duty cycle which can be independently controlled.

9 Claims, 3 Drawing Sheets

X-RAY APPARATUS COMPRISING A POWER SUPPLY SECTION FOR POWERING AN X-RAY TUBE

BACKGROUND OF THE INVENTION

1. Field of the Invention

The invention relates to an X-ray apparatus, comprising a power supply section for powering an X-ray tube with a high-voltage transformer which comprises two groups of primary and secondary windings provided on the same transformer core, the coupling between the primary windings from different groups being weaker than that between primary and secondary windings belonging to the same group, the primary windings of the two groups being connected to two inverters which operate at the same frequency.

2. Description of the Related Art

An X-ray apparatus of this kind is known from DE-OS 32 18 535 which corresponds to U.S. Pat. No. 4,514,795. The known X-ray apparatus is also suitable for symmetrically powering X-ray tubes which comprise a metal envelope and in which the cathode current is larger than the anode current. This necessitates a non-symmetrical power distribution between the two inverters, which would lead to disturbing equalization currents in the transformer if such currents were not prevented by the weak coupling of the transformer windings from different groups in comparison with windings from the same group.

In the known X-ray apparatus, comprising two inverters constructed as series-resonant inverters with thyristors, a non-symmetrical power distribution is produced by a delay between of the switching elements of the two inverters. The power is then varied by variation of the frequency at which the one of the two inverters switching on and the other of the two inverters switching on operate. In an X-ray generator, however, the power supplied, must be variable by several powers of ten, implying a correspondingly large frequency variation. However, the X-ray apparatus will then inevitably operate in the audio-frequency range, leading to audible and disturbing operating noise and, moreover, to an undesirable high ripple on the output voltage. It is a further drawback that when different voltages are adjusted, the inverters are loaded by different switching currents, which limits the performance in this mode of operation.

SUMMARY OF THE INVENTION

It is an object of the present invention to improve a device of the kind set forth. This object is achieved in accordance with the invention in that there are provided means for operating the inverters with a fixed frequency and with an independently controllable duty cycle. Herein duty cycle is to be understood to mean the ratio of the pulse duration of the voltage pulses applied to the primary windings by the inverters to the period duration of the fixed frequency with which the inverters are switched. The operation with a fixed frequency offers the advantage that this frequency may be chosen so that it is higher than the audio-frequency range, so that no disturbing operating noise occurs. Power adjustment by variation of the duty cycle offers the advantage that in a constant-current working point of the user a substantially linear relationship arises between the output voltage (across the secondary windings) and the duty cycle, which is an attractive aspect for a higher-ranking control system.

As has already been stated, the equalization currents can be reduced by the claimed configuration of the coupling ratios between the windings belonging to the same group and those belonging to different groups. In the case of an unfavorable voltage pulse behavior, however, substantial equalization currents can still occur. In a further embodiment of the invention such equalization currents can be reduced in that the means for operating the inverters are constructed so that the voltage pulses generated by the two inverters overlap in time in such a manner that the shorter one of the two voltage pulses occurs always within the period of the longer voltage pulse, and that the two voltage pulses cause temporal variations in the same direction of the magnetic flux in the transformer core. When the primary windings of the two groups have the same winding direction, a temporal variation of the magnetic flux in the same direction is obtained by voltage pulses of the same polarity; in the case of windings having an opposed winding direction, this is the achieved when the voltage pulses applied are of opposite polarity.

In this embodiment of the invention the duty cycle of the two inverters can still be independently controlled to a high degree, but the voltage pulses are somehow synchronized. For example, it would basically be possible to make the leading edges or the trailing edges of the two pulses coincide. However, in that case equalization currents can still occur, which would cause the inverter generating the shorter respective pulse to be loaded by a larger switching current than the other inverter, and a high reactive power would be exchanged between the inverters. Therefore, in a preferred embodiment of the invention the means for operating the inverters are constructed in such a manner that the centers of the voltage pulses supplied by the two inverters coincide in time. The voltage pulses generated by the two inverters thus are temporally symmetrical relative to one another. Voltage pulses of unequal length cause only a slight exchange of reactive power between the two inverters, the switching currents in the two inverters then having approximately the same maximum value.

BRIEF DESCRIPTION OF THE DRAWING

The invention will be described in detail hereinafter with reference to the drawings. Therein.

DETAILED DESCRIPTION OF THE PREFERRED EMBODIMENTS

Figure 1:
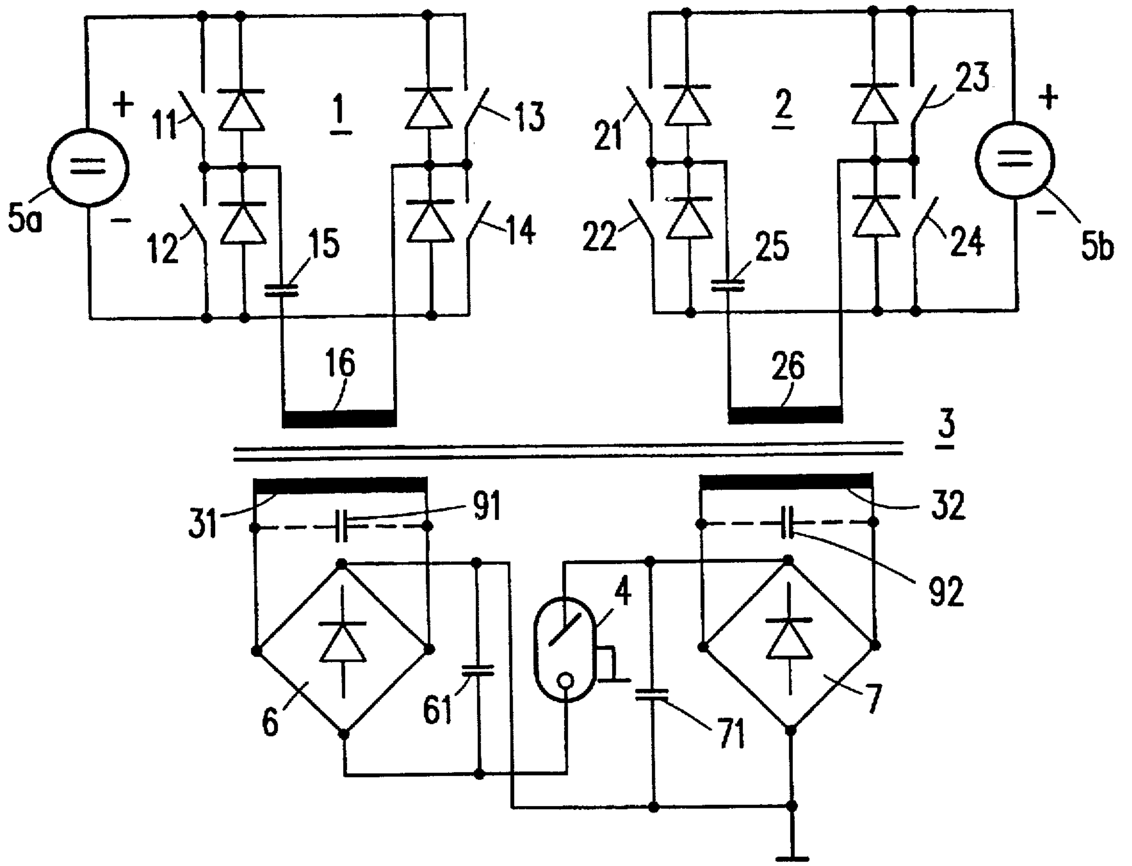
FIG. 1 shows a part of a circuit diagram of an X-ray apparatus.

FIG. 1 shows an X-ray tube 4 which is powered, via a transformer 3, by two alternating voltage sources 1, 2 which are constructed as series-resonant inverters. Each of the inverters is connected to a respective direct voltage source 5a, 5b. Each inverter comprises in known manner four switches 11 . . . 14 and 21 . . . 24 which are connected in known manner so as to form a full bridge and which are, for example IGBT type or other deactivatable power semiconductors. The junction of the bridge branch comprising the switches 11, 12 is connected, via the series connection of a capacitor 15 and a primary winding 16, belonging to the first winding group, of the transformer 3, to the junction of the switches 13, 14 of the other branch of the bridge.

Analogously, the junction of the switches 21 and 22 is connected, via the series connection of a capacitor 25 and a primary winding 26, belonging to the second winding group, of the transformer 3, to the junction of the switches 23 and 24. The secondary side of the transformer 3 is formed by two identically constructed secondary windings 31 and 32 which belong to the first and to the second winding group, respectively.

The series-resonance frequency of the circuits 15, 16 and 25, 26 is determined by the capacitance of the capacitors 15 and 25, respectively, and by the stray inductance of the identically constructed primary windings 16, 26 and the secondary windings 31, 32 of the transformer; an additional inductance is not required in principle. The winding capacitances 91, 92 of the secondary windings can be used as part of the series-resonant circuit. The switches 11 . . . 14 and 21 . . . 24 of the inverters 1 and 2, respectively, operate with the same, constant switching frequency which corresponds to the series-resonance frequency.

A respective rectifier 6, 7 is connected to the secondary windings 31, 32, the output voltages of said rectifiers being smoothed by a capacitor 61, 71, respectively. For reasons of insulation, the two secondary windings are often further subdivided, each sub-winding comprising its own rectifier. The rectifiers 6 and 7 are connected in series and the smoothed output voltage is applied to the cathode and the anode of the X-ray tube 4. Because of the series connection, the secondary winding 31 and 32, the rectifiers 6 and 7 as well as the capacitors 61 and 71 need be designed for only half the maximum value of the high voltage across the X-ray tube.

The X-ray tube 4 may comprise a grounded metal envelope as diagrammatically indicated in the drawing. In that case a part of the cathode current flows from the anode and another part flows from ground, via the metal envelope, so that the cathode current is larger than the anode current. Because of these unequal currents, in a high-voltage generator in which the rectifiers generate voltage pulses exhibiting an identical variation in time, the cathode voltage would be lower than the anode voltage. Notably in the case of a low voltage between anode and cathode this would lead to limitation of the cathode current by space charge effects in the X-ray tube, so that its thermal loadability could no longer be fully utilized for low anode voltages. It is desirable to achieve operation in which, at least for high tube voltages, the voltage between the anode and ground has exactly the same absolute value as the voltage between the cathode and ground. In the case of a low tube voltage it could even be effective to make the cathode voltage higher than the anode voltage, so that said space charge effects could be avoided and the thermal loadability of the X-ray tube utilized better.

For these control possibilities, however, the voltage pulses of the rectifier 1 must have a different (longer) duration than those of the inverter 2. However, in that case disturbing equalization currents may occur between the windings.

Figure 2:
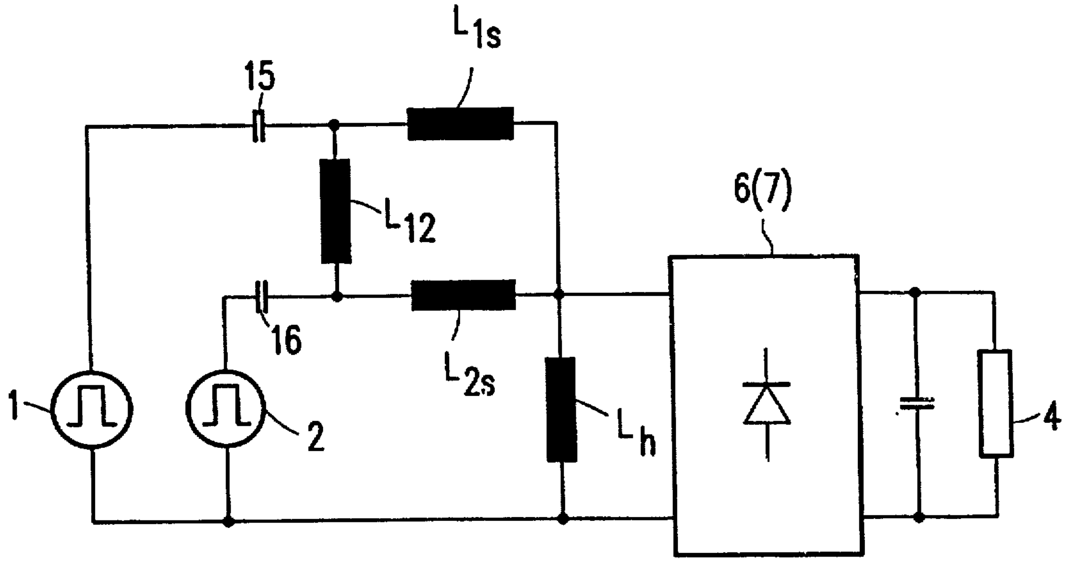
FIG. 2 shows an equivalent circuit diagram of a part of the X-ray apparatus.

The effect of the equalization currents can be explained on the basis of the simplified equivalent circuit diagram of FIG. 2 in which the transformer has been replaced by the inductances $L_{12}$, $L_{1s}$, $L_{2s}$ and $L_h$. The inductances $L_{1s}$ and $L_{2s}$ represent the leakage inductance of the primary windings 16 and 26, respectively, relative to the secondary side, and the inductance $L_{12}$ represents the leakage inductance between the two primary windings whereby the outputs of the inverters 1, 2 are coupled to one another. $L_h$ is the main inductance which is high in comparison with the previously mentioned inductances.

If the primary windings 16, 26 were strongly coupled to one another, as is normally desired in transformers of this kind, the inductance $L_{12}$ would be small in comparison with the inductances $L_{1s}$, $L_{2s}$. If the voltages supplied by the inverters 1, 2 were to deviate from one another in time because of switching times of unequal duration for the switches 11 . . . 14 on the one hand and 21 . . . 24 on the other hand, the complete output voltage of the inverter 1 would initially be present across the inductance $L_{12}$ and cause a difference current whose rate of change would correspond to the quotient of this voltage and the inductance $L_{12}$. If subsequently the two voltages would be equal again, the current flowing in $L_{12}$ would oscillate in the circuit formed by the capacitors 15, 16 and the inductance $L_{12}$; the resonance frequency would then be substantially higher than the series-resonance frequency of the inverter, because $L_{12}$ is small in comparison with $L_{1s}$ or $L_{2s}$. Thus, equalization currents of high frequency and high amplitude would flow.

Amplitude and frequency of the equalization currents are reduced to a level which is no longer disturbing when two steps are taken:

a) Reducing the coupling between transformer windings belonging to different winding groups.

b) Synchronizing the switching pulses for the two inverters.

These two steps will be described in detail hereinafter.

Figure 3:
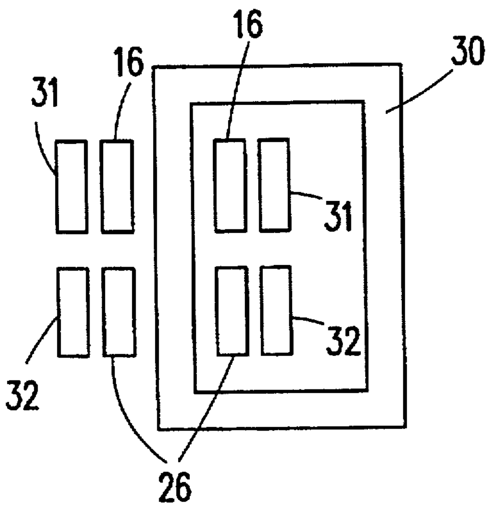
FIG. 3 shows the arrangement of the primary and secondary windings on the transformer core.

The coupling of the two primary windings 16, 26 to one another is made weaker than the coupling between each of these primary windings and the secondary winding overall (i.e. the series connection between the windings 31 and 32) or between the relevant primary winding 16 or 26 and the sub-winding 31, or 32 belonging to the same winding group. This is achieved by way of the construction of the transformer which is diagrammatically shown in FIG. 3. Therein, the primary windings 16 and 26 are arranged adjacent to and at a distance from one another on a transformer core 30, for example a tape-wound core. The primary windings 16 and 26 are enclosed by the secondary windings 31 and 32, respectively.

As a result of this construction, the magnetic or inductive coupling between the primary windings 16 and 26, but also between the secondary windings 31 and 32, is substantially weaker than the coupling between one of the primary windings (for example, 16) and the enclosing secondary winding (31).

As is known, the magnetic or inductive coupling between two windings $L_1$, $L_2$ can be defined by the coupling factor $$k = M/\sqrt{(L_1 \cdot L_2)}$$

where M is the mutual inductance between the two windings $L_1$, $L_2$. The leakage inductance between the two windings is proportional to the factor $(1-k^2)$.

Because the coupling between the primary windings is weaker than the coupling between a primary winding and the secondary winding 31, 32 it is achieved that $L_{12}$ is greater than $L_{1s}$ or $L_{2s}$. For example, when the coupling factor between the primary windings amounts to 0.973 and that between a primary winding and the secondary winding amounts to 0.993, $L_{12}$ is approximately four times greater than $L_{1s}$ and $L_{2s}$. Only a reduced equalization current whose frequency, generally speaking, has not been increased flows in that case.

The coupling of the primary windings to one another and of the secondary windings to one another can be further reduced by arranging the primary windings with the enclosing secondary winding on opposite limbs instead of on the same limb. However, this leads to different dimensions of the transformer core.

In the described transformer construction substantial equalization currents can still arise in the event of a disadvantageous temporal position of the switching pulses for the switches of the two inverters 1, 2. These equalization currents are substantially reduced in that the voltage pulses generated by the two inverters overlap one another in time in such a manner that the shorter one of the two voltage pulses always appears within the period of the longer voltage pulse, and in that the two voltage pulses cause temporal variations of the magnetic flux in the same direction in the transformer core.

The leading edges of the two voltage pulses or their trailing edges could in principle coincide. However, in that case equalization currents could still occur, so that the inverter generating the shorter pulse would be loaded by a larger switching current than the other inverter and a high reactive power would be exchanged between the inverters. This can be avoided by way of a temporally symmetrical variation of the output voltages.

Figure 4:
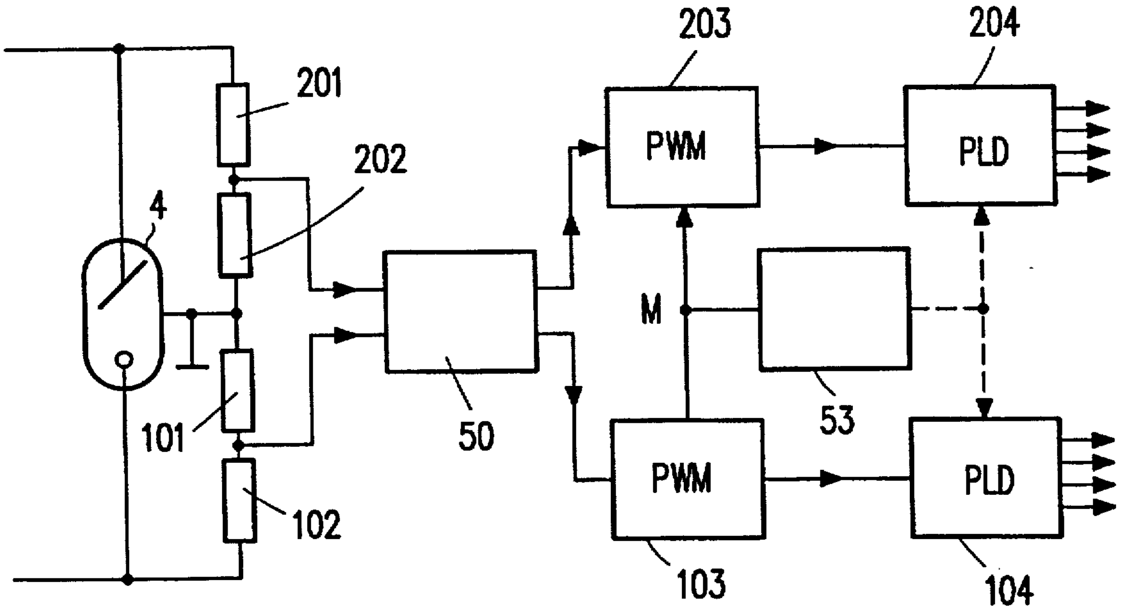
FIG. 4 shows a further part of the arrangement.

FIG. 4 shows an appropriate circuit in this respect. The voltage between anode and ground is measured by a high-voltage measuring divider consisting of the resistors 201 and 202, whereas the voltage between cathode and ground is measured by a high-voltage measuring divider consisting of the resistors 101 and 102. The measuring voltages on the taps of the high-voltage measuring dividers are applied to a control device 50 which compares the two measuring voltages (and also their sum, if necessary) with reference values which are dependent on the predetermined reference value of the voltage across the X-ray tube, but also on the control strategy.

If it were only desirable to make the anode and cathode voltages always equal, two mutually independent, simple controllers could be used so as to adjust the voltage across the anode and across the cathode to a respective presettable reference value. However, if the distribution of the voltage between anode and cathode should also be dependent on the value of this voltage, the control circuit 50 should process the two measuring signals together. A first output of the control circuit 50 supplies a first control signal for controlling a pulse width modulator 103 and a second output supplies a second control signal for controlling a pulse width modulator 203. The pulse width modulators 103 and 203 supply pulses of fixed frequency and a duty cycle, or a pulse duration, which is dependent on the control signal on the input of the relevant pulse width modulator. These pulses, being temporally symmetrical relative to one another, are converted, by means of a PLD (Programmable Logic Device) 104 and 204, respectively, into a switching pulse pattern for the four switches 11 . . . 14 and 21 . . . 24 of the associated inverters 1 and 2, respectively, in such a manner that the voltage pulses supplied by the inverters 1 and 2 always have the pulse duration predetermined by the associated pulse width modulator 103 and 203, respectively.

Figure 5:
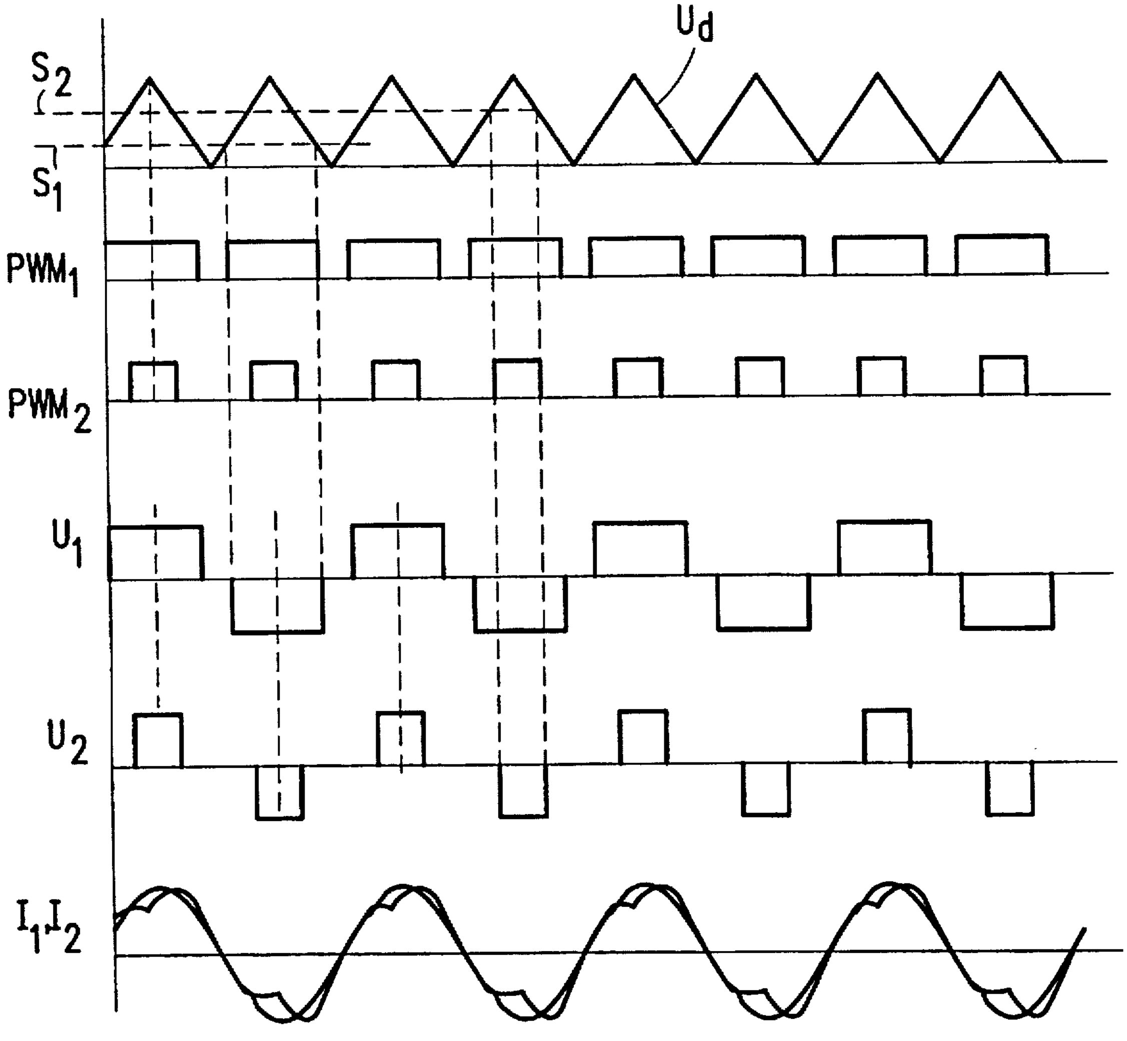
FIG. 5 shows the temporal variation of various signals in this arrangement.

The pulse width modulators 103 and 203 receive not only the control signals, but also a symmetrical delta voltage $U_d$ which is generated by a function generator 53. The frequency of the delta voltage $U_d$, whose temporal variation is shown in FIG. 5 (first line), amounts to twice the series-resonance frequency of the circuits 15, 16 and 25, 26 of the inverters 1, 2, respectively. The function generator 53, moreover, supplies clock signals for the components 104 and 204 as denoted by dashed lines in FIG. 4.

In the pulse width modulators 103 and 203 the delta voltage $U_d$ is compared with the control signals $S_1$ and $S_2$, respectively (denoted by dashed lines in FIG. 5) and on the output of the pulse width modulators there are generated pulses $PWM_1$ and $PWM_2$, respectively, whose leading edge coincides with the exceeding of and whose trailing edge coincides with the dropping below the control signals $S_1$ and $S_2$, respectively, by the delta voltage $U_d$.

After conversion of the pulse width modulated pulses $PWM_1$ and $PWM_2$ into switching pulses for the switches 11 . . . 14 and 21 . . . 24, respectively, of the inverters 1 and 2, there are obtained inverter voltages $U_1$ and $U_2$ exhibiting the pulse-shaped temporal variation shown in FIG. 5 (therein, $U_1$ and $U_2$ represent the respective voltages on the series connections 15, 16 and 25, 26, respectively).

$U_1$ and $U_2$ deviate from $PWM_1$ and $PWM_2$, respectively, in that the polarity of every second pulse is inverted, so that the fundamental oscillation contained in the output voltages $U_1$ and $U_2$ has a frequency amounting to half the frequency of the delta oscillation $U_d$. Because the frequency of the delta oscillation amounts to twice the series-resonance frequency of the inverters 1, 2, the frequency of this fundamental oscillation corresponds to the series-resonance frequency. FIG. 5 shows that the voltage pulses $U_1$ and $U_2$ are temporally symmetrical, i.e. the temporal centers of these pulses coincide. The voltage pulses of $U_1$ and $U_2$ always have the same polarity, provided that the primary windings 16 and 26 have the same winding direction. When the primary windings 16 and 26 have opposed winding directions, the pulses must be of opposite polarity.

If this condition is satisfied, the equalization currents will be minimum and only a small reactive power will be exchanged between the windings. As can also be deduced from FIG. 5, the currents $I_1$ and $I_2$ flowing in the primary windings 16 and 26, respectively, then have substantially the same maximum value, i.e. the current load in the switches 11 . . . 14 is approximately equal to that in the switches 21 . . . 24, even though the duty cycle of $U_1$ amounts to approximately twice the duty cycle of $U_2$, so that the cathode voltage derived from $U_1$ also amounts to approximately twice the anode voltage derived from $U_2$.

For a working point with constant tube current, the cathode voltage and the anode voltage are substantially linearly dependent on the duty cycle, or the pulse duration, of the pulse width modulated signals $PWM_1$ and $PWM_2$. However, only a minor dependency exists between the cathode voltage and the duty cycle of the pulse duration modulated signal $PWM_2$; the same holds for the dependency of the anode voltage on the duty cycle of the signal $PWM_1$. The linear dependency of the high voltage on the duty cycle is attractive for the control behavior.

FIGS. 4 and 5 are based on the pulse width modulators 103 and 203 being analog circuits. However, it is also possible to implement the pulse width modulation, and possibly also the generating of the switching pulses by the components 104 and 204, by means of programmable controller components.

The invention has been described on the basis of an X-ray apparatus or an X-ray generator. However, it can also be used for other arrangements for a power supply for user equipment where it is necessary to control the voltage to the user equipment in a predefined manner.

We claim:

1. An X-ray apparatus, comprising a power supply section for powering an X-ray tube with a high-voltage transformer which comprises two groups of primary and secondary windings provided on the same transformer core, the coupling between the primary windings from different groups being weaker than that between primary and secondary windings belonging to the same group, the primary windings of the two groups being connected to two inverters which operate at the same frequency, each inverter comprising a different set of four switches forming a full bridge, and means for operating the inverters with a fixed frequency and with an independently controllable duty cycle.

2. An X-ray apparatus as claimed in claim 1, wherein the means for operating the inverters are constructed so that two voltage pulses generated by the two inverters overlap in time in such a manner that a shorter one of the two voltage pulses occurs always within the period of a longer one of the two voltage pulses, and the two voltage pulses cause temporal variations in the same direction of magnetic flux in the transformer core.

3. An X-ray apparatus as claimed in claim 2, wherein the means for operating the inverters are constructed in such a manner that the centers of the two voltage pulses generated by the two inverters coincide in time.

4. An X-ray apparatus as claimed in claim 1, wherein the inverters are constructed as series-resonant inverters and the frequency at which the inverters operate corresponds at least substantially to a series-resonance frequency.

5. An X-ray apparatus as claimed in claim 4, wherein each inverter comprises a capacitance which forms a series-resonant circuit in conjunction with the reactance of an associated primary winding.

6. An X-ray apparatus as claimed in claim 1, wherein the means for operating the inverters comprise a pulse width modulator for each inverter.

7. An X-ray apparatus as claimed in claim 1, wherein the primary windings of the two groups are arranged at adjacent positions along the core and the secondary windings of the two groups are arranged at said adjacent positions along the core, and enclose the primary windings belonging to the respective same group.

8. An X-ray apparatus as claimed in claim 1, wherein rectifiers which are connected in series in respect of direct voltage are connected to the secondary windings.

9. An X-ray apparatus as claimed in claim 1, wherein the X-ray tube powered by the X-ray apparatus has an anode current which deviates from its cathode current.

* * * * *